May 2, 1967 R. R. COUNCILMAN 3,316,642

HIGHLY DAMPED, BALANCED MOUNTING FOR A PLOTTER STYLUS

Filed Nov. 26, 1965

RICHARD R. COUNCILMAN
INVENTOR

BY Robert M. Sperry
ATTORNEY

United States Patent Office 3,316,642

Patented May 2, 1967

3,316,642

HIGHLY DAMPED, BALANCED MOUNTING FOR A PLOTTER STYLUS

Richard R. Councilman, Garland, Tex., assignor, by mesne assignments, to Ling-Temco-Vought, Inc., Dallas, Tex., a corporation of Delaware Filed Nov. 26, 1965, Ser. No. 509,845
4 Claims. (Cl. 33—18)

This invention relates to plotting projectors and is particularly directed to improved means for mounting the stylus of a plotting projector.

Recently, slide projectors have been developed which are supplied with slides having an opaque coating and which are provided with a movable stylus for scribing the coating to permit projection of the scribed data. Scribing projectors of this type may, for example, be driven by computers which are supplied with data from satellite tracking stations, and the like, and serve to provide a visual display of such data. A typical scribing projector is shown in the patent to Donald M. Fenske et al., Pat. No. 2,859,659, issued Nov. 11, 1958.

Although the scribing projectors of the prior art have been generally satisfactory, the rate at which such projectors could plot data has been relatively slow. Thus, where the data to be plotted was alphabetic or numeric, the plotting rate of prior art projectors has generally been limited to about four characters per second. At rates above this, vibrations have occurred in the stylus mounting which have caused the stylus to perform erratically or "skip." Numerous means have been proposed heretofore for overcoming this problem. However, none of the prior art devices have been entirely satisfactory.

In contrast, the apparatus of the present invention makes it possible to plot such characters at rates of approximately thirty characters per second without "skipping." The advantages of the present invention are preferably attained by counter balancing the stylus mounting plate and providing means for damping vibration of the stylus mounting plate.

Accordingly, it is an object of the present invention to improve scribing projectors.

Another object of the present invention is to provide improved means for mounting the stylus of a scribing projector.

A specific object of the present invention is to provide means for counterbalancing the stylus mounting plate of a scribing projector together with means for damping vibration of the stylus mounting plate.

These and other objects and features of the present invention will be apparent from the following description taken wtih reference to the figures of the accompanying drawing.

Figures 1, 2, 3:
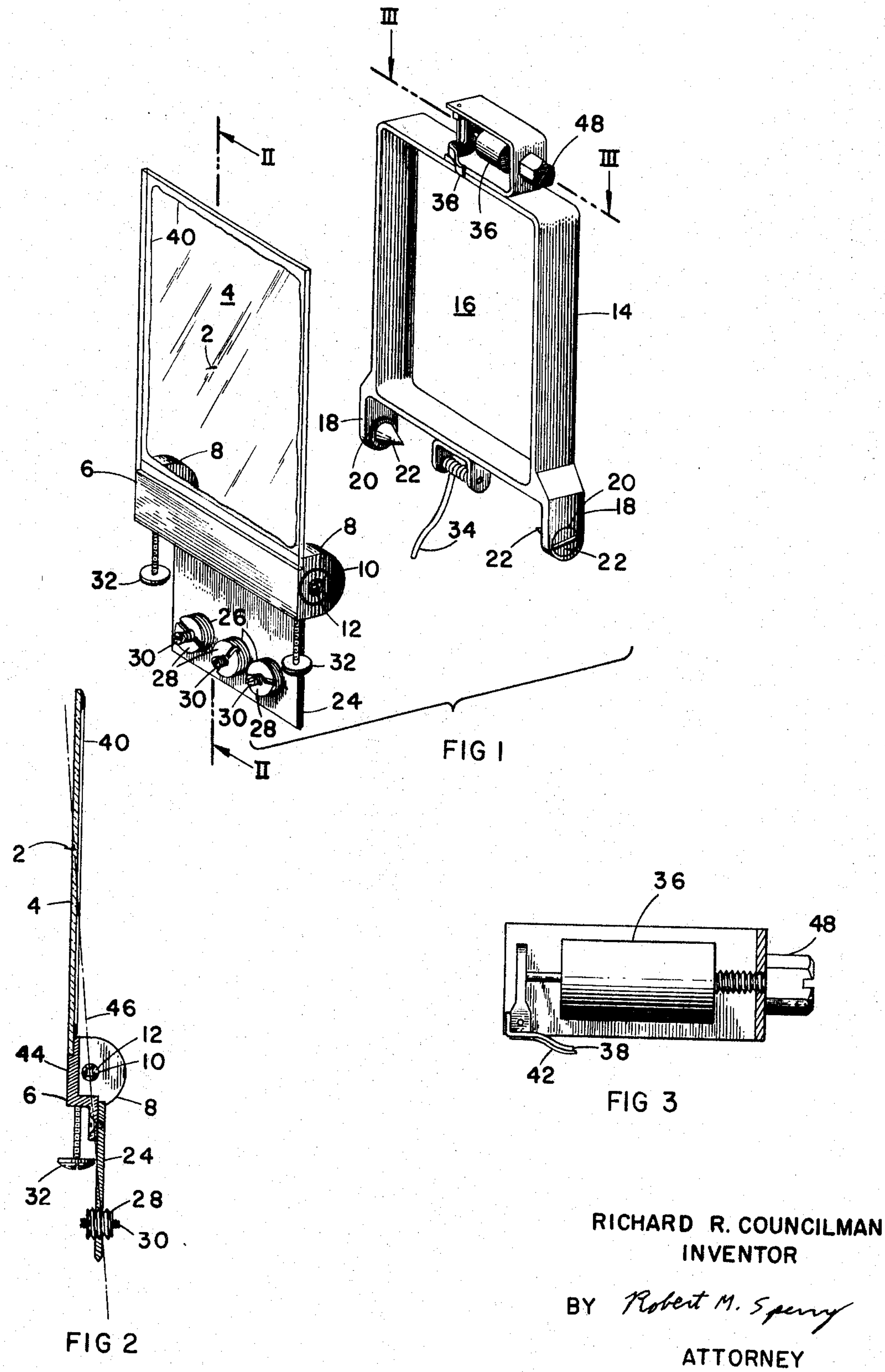
FIGURE 1 is an exploded isometric view showing a stylus mounting embodying the present invention.
FIGURE 2 is a vertical section through the stylus mounting plate of FIG. 1 taken on the line II—II.
FIGURE 3 is horizontal section showing the stylus actuator of the device of FIG. 1, taken on the line III—III of FIG. 1.

In that form of the present invention chosen for purposes of illustration in the drawing, FIG. 1 shows a stylus 2 mounted centrally of a transparent mounting plate 4, formed of glass or the like, which is fixedly secured to a base member 6 by cement or the like, not shown. The base member 6 is formed with a pair of rearwardly projecting flanges 8 and each of the flanges 8 has an opening 10 extending therethrough in which is mounted a ball bearing 12. A supporting frame 14 is provided and is carried by suitable stylus positioning means, which serve to translate the stylus mounting means vertically and horizontally to pre-position the stylus, prior to a scribing operation, and to cause appropriate movement of the stylus to scribe a desired symbol, during the scribing operation. The stylus positioning means forms no part of the present invention and, hence, is not shown herein. However, a typical stylus positioning means and its relationship to a stylus mounting means, such as that of the present invention, and to the scribing projector as a whole may be determined from the aforementioned patent to Donald M. Fenske et al., Pat. No. 2,859,659.

The supporting frame 14 is formed with an opening 16 extending therethrough to permit passage of light from the projector lamp, or image to be projected not shown, to the slide, not shown. Furthermore, the supporting frame 14 is provided with two depending legs 18 having holes 20 formed therein to threadedly receive pivots 22. In assembly, the pivots 22 engage the ball bearings 12 of base member 6 to pivotally secure the base member 6 and mounting plate 4 to the supporting frame 14.

The base member 6 is provided with a depending flange 24 formed of metal or the like, which is approximately equal in weight to the mounting plate 4 and serves as a counterweight for the mounting plate 4. The flange 24 is provided with a plurality of openings 26 which each threadedly receive a respective one of the balancing weights 28. If desired, fine balance screws may be provided for threaded adjustment within suitable openings formed centrally of the balance weights 28, as seen at 30. The balance weights 28 and screws 30 are adjustable to vary the location of the center-of-mass of the flange 24. In addition, a pair of vertically adjustable balance screws 32 are provided adjacent opposite sides of the base member 6. A spring 34 is mounted on the bottom of supporting frame 14 and bears against the flange 24 to urge the mounting plate 4 and stylus 2 to an "out-of-plot" position, wherein the stylus 2 does not engage the slide. Finally, a solenoid 36 is mounted on top of the support frame 14 and actuates a spring 38 which engages the upper end to the mounting plate 4 and serves to drive the stylus 2 to the "plot" position, in which it engages the slide to perform a scribing operation.

In operation, solenoid 36 is actuated to cause spring 38 to urge mounting plate 4 to the "plot" position, causing stylus 2 to engage the slide to perform a scribing operation. The pressure which spring 38 applies to mounting plate 4 may be varied by adjusting the position of solenoid 36 by means of nut 48. After the scribing operation, solenoid 36 is deenergized and spring 34 bears against flange 24 to urge mounting plate 4 and stylus 2 to the "out-of-plot" position. Unfortunately, many materials have a natural frequency of vibration and, with the prior art devices, when attempts are made to move the mounting plate and stylus—into and out of the "plot" position rapidly and frequently, vibrations are set up in the mounting plate which cause the stylus to perform erratically or "skip." Moreover, it has been found that any unbalance in the mounting plate tends to aggravate such vibration. To overcome this in the device of the present invention, the mounting plate 4 is provided, about its periphery, with a ridge 40 of vibration absorbing material, such as rubber. This acts to absorb or damp vibrations in the mounting plate 4. Moreover, a strip 42 of vibration absorbing material is secured to the surface of the spring 38 which engages the mounting plate 4. In addition, the resilience of springs 34 and 38 is made such that the springs 34 and 38 act to damp vibration of the stylus mounting asembly, which includes mounting plate 4 and base member 6.

To assure proper balance, the base member 6 is formed so that depending flange 24 is off-set from the portion 44 of base member 6 to which mounting plate 4 is attached, as seen in FIG. 2, so that the plane of mounting plate 4 lies on one side of ball bearings 12 and the plane of flange 24 lies on the opposite side. As indicated above, the weight of flange 24 is approximately equal to the weight of mounting plate 4. It has been found that, by adjusting the balance weights 28 and 30 so that a line joining the center-of-mass of the mounting plate 4 with that of flange 24 will pass through the axis of the ball bearings 12, as indicated by dashed line 46, the stylus 2 is prevented from inadvertently engaging or disengaging from the slide during high speed movement of the stylus positioning means. Preferably, spring 34 will be formed to have a relatively low spring rate, while spring 38 will be formed to have a relatively high spring rate. Moreover, it is important that the spring rate of each of the springs 34 and 38 must not be equal to the natural frequency of the mounting plate 4. When this is done, it is found that it is possible to increase the plotting rate of the projector to approximately thirty characters per second, as compared with plotting rates of about four characters per second for prior art devices.

Obviously, numerous variations and modifications may be made without departing from the present invention. Accordingly, it should be clearly understood that the form of the present invention described above and shown in the figures of the accompanying drawing is illustrative only and is not intended to limit the scope of the present invention.

What is claimed is:

1. Stylus mounting means for plotting projectors, said mounting means comprising:

a supporting frame having an opening to permit passage of light therethrough;

pivot means carried by said supporting frame;

a base member having anti-friction means rotatably supporting said base member on said pivot means;

a transparent mounting plate rigidly secured to said base member and extending adjacent said frame to substantially cover said opening;

a stylus fixedly secured to said mounting plate at a location substantially corresponding with the center of said opening;

a flange carried by said base member and extending from said base member in a direction substantially opposite from said mounting plate, balance means carried by said flange and adjustable to vary the location of the center-of-mass of said flange, first resilient means mounted on said frame and engageable with said flange to urge said stylus to an "out-of-plot" position, a solenoid on said frame, and second resilient means operable by said solenoid and engageable with said mounting plate to urge said stylus to a "plot" position.

2. The device of claim 1 wherein:

a ridge of vibration absorbing material is disposed about the periphery of said mounting plate.

3. The device of claim 1 wherein:

said flange lies in a first plane extending parallel to a second plane containing said mounting plate, said first plane and said second plane being located on opposite sides of said anti-friction means; and said balance means are adjusted to cause the center-of-mass of said flange to lie on a line passing through the center-of-mass of said mounting plate and through the axis of said anti-friction means.

4. The device of claim 1 wherein:

the spring rate of said first resilient means is relatively low and the spring rate of said second resilient means is relatively high, the spring rate of each of said resilient means being different from the natural frequency of said mounting plate.

No references cited.

LEONARD FORMAN, *Primary Examiner.*

H. N. HAROIAN, *Assistant Examiner.*